J. PETERSON.
INDURATED FIBER ARTICLE.
APPLICATION FILED DEC. 19, 1911.
1,097,666.
Patented May 26, 1914.
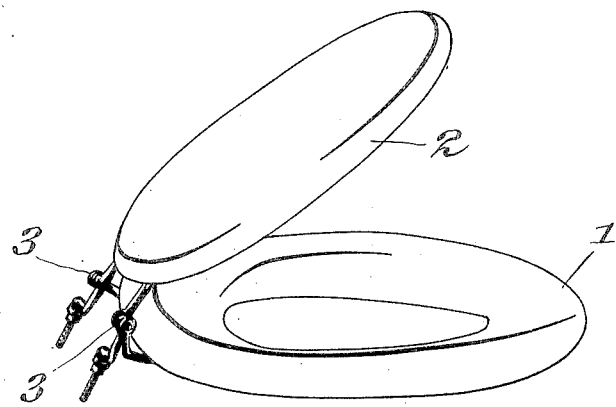

UNITED STATES PATENT OFFICE.

JESSE PETERSON, OF LOCKPORT, NEW YORK, ASSIGNOR TO UNITED INDURATED FIBRE CO., A CORPORATION OF NEW YORK.

INDURATED-FIBER ARTICLE.

1,097,666.   Specification of Letters Patent.   Patented May 26, 1914.

Original application filed March 11, 1910, Serial No. 548,540. Divided and this application filed December 19, 1911. Serial No. 666,791.

*To all whom it may concern:*

Be it known that I, JESSE PETERSON, a citizen of the United States of America, residing at Lockport, county of Niagara, State of New York, have invented certain new and useful Improvements in Indurated-Fiber Articles, of which the following is a specification.

My invention relates generally to the production of articles out of indurated fiber and more specifically comprises certain apparatus used in water closets such as seats and tanks, and a special process for making the same in integral pieces out of such fiber.

This application is a division of my application Serial No. 548,540, filed March 11, 1910.

For practical success it is essential that such articles should be formed of material strong enough to firmly hold screws driven into them, and of a character such as will take a high polish and resist the action of moisture and gases, as well as that of chemical disinfectants used in cleaning. Ordinary indurated fiber will not meet these requirements, but after a long period of careful experiment I have discovered a process by which satisfactory articles of this character can be produced from such fiber.

In carrying out my process I preferably start with a mixture of one-half ground wood and one-half old newspapers by weight, which is thoroughly pulped with water in a beating engine. The pulp is then pumped into dies in a suitable press and subjected to pressure of from 25 to 30 tons until all but about 30% of water by weight is expressed. The article so formed is then thoroughly dried in a dry house and pressed dry in a hot press under a total pressure of about 400 tons to thoroughly compact the fibers, after which it is indurated by soaking in a hot mixture of 45% kidney oil, 45% rosin and 10% paraffin wax and baking in an oven. This baking drives off all the volatile matter leaving the material a hard, tough, horny mass. This is sandpapered, painted or varnished, or otherwise finished off.

The kidney oil I find to be the best material for driving the rosin and wax into the fibers, and to have just the right evaporation point to be conveniently driven out of the mass after it has done this work. Kidney oil is the commercial name for the product of the distillation of rosin from which the slight amount of water usually present has not been extracted.

The accompanying drawing shows one form of water closet seat and cover therefor made in accordance with my invention.

The seat 1 is made in one piece, and the cover 2 is hinged to it by hinges 3, 3, fastened to the parts by screws, not shown. The article thus produced is capable of taking and maintaining a high polish. It will not warp, split or splinter under ordinary use. It will withstand the use of the powerful chemical disinfectants used in cleaning such apparatus, and will hold screws and nails better than natural wood.

The old newspapers used contribute valuable qualities to the finished article both on account of the condition of the wood fiber composing them, and of the effect of the printer's ink mixed with it. The dry pressing in a hot press also contributes much to the ultimate compactness and strength of the article.

Having, therefore, described my invention, I claim:

1. A composition for use in making water closet seats and similar articles comprising substantially equal parts of pulped wood fiber and old newspapers with the printer's ink adhering thereto molded and indurated.

2. A composition for use in making water closet seats and similar articles comprising substantially equal parts of pulped wood fiber and old newspapers with the printer's ink adhering thereto molded and indurated with a mixture of rosin, kidney oil and paraffin wax.

3. A composition for use in making water closet seats and similar articles composed of pulped wood fiber and old newspapers molded and indurated with a mixture of 45% rosin, 45% kidney oil and 10% paraffin wax.

JESSE PETERSON.

Witnesses:
W. R. SEIGLE,
J. FARLEY.